United States Patent [19]

Hurst et al.

[11] Patent Number: 5,016,249
[45] Date of Patent: May 14, 1991

[54] DUAL COMPUTER CROSS-CHECKING SYSTEM

[75] Inventors: David C. Hurst, Knowle; Malcolm Brearley, Solihull, both of England

[73] Assignee: Lucas Industries public limited company, Birmingham, England

[21] Appl. No.: 286,154

[22] Filed: Dec. 19, 1988

[30] Foreign Application Priority Data

Dec. 22, 1987 [GB] United Kingdom ............. 8729901

[51] Int. Cl.$^5$ ............................................. G06F 11/00
[52] U.S. Cl. ................................. 371/16.1; 371/5.5; 371/68.3
[58] Field of Search .............. 371/14, 16.1, 16.4, 371/68.3, 18, 9.1, 5.1, 5.5; 364/186, 187, 132, 200 MS File, 900 MS File

[56] References Cited

U.S. PATENT DOCUMENTS

| | | | |
|---|---|---|---|
| 3,618,015 | 11/1971 | Homonick | 371/68.1 X |
| 3,810,119 | 5/1974 | Zieve | 371/68.3 X |
| 4,012,717 | 3/1977 | Censier | 371/9.1 |
| 4,400,792 | 8/1983 | Strelow | 371/68.3 X |
| 4,566,101 | 1/1986 | Skonieczy | 371/5.3 |
| 4,590,549 | 5/1986 | Burrage | 371/68.3 X |
| 4,773,072 | 9/1988 | Fennel | 364/187 X |
| 4,792,955 | 12/1988 | Johnson | 371/68.1 X |
| 4,843,608 | 6/1989 | Fu | 371/68.1 |

Primary Examiner—Jerry Smith
Assistant Examiner—Robert W. Beausoliel
Attorney, Agent, or Firm—Scrivener and Clarke

[57] ABSTRACT

A dual computer cross-checking system includes a control computer for controlling a process in accordance with input data and a monitoring computer. The two computers are interconnected to exchange check data on a cyclic basis, each computer carrying out a number of processing operations on the received check data before transmitting the data thus processed to the other computer. In addition, each computer checks the received check data against an expected value. An error condition is detected if the result of at least one of these comparisons is found to be incorrect.

14 Claims, 4 Drawing Sheets

CHECKING DATA TRANSMISSION SCHEME

DUAL COMPUTER CROSS-CHECKING SYSTEM

DESCRIPTION

This invention relates to a dual computer cross-checking system for use in a high integrity control system.

By way of example, the invention is applicable to a vehicle anti-skid brake control system, in which a computer is used to process data received from wheel speed transducers and to control the release of the brake of a particular wheel when the deceleration of that wheel is too rapid.

Clearly, in a system of this kind it is important to ensure that a computer failure does not give rise to a condition in which a brake is released when no skid condition exists. It has already been proposed to include in the system two identical computers which both receive the same input signals and, when operating correctly, both produce the same control output signals. Connections are provided between the two computers to enable each to monitor the control output signals of the other. Redundant processing is used to compare the output signals and if discrepancies between these control output signals arise, anti-skid operation is inhibited, so that the braking system operates as a normal system without anti-skid operation.

This prior proposal has several disadvantages. Firstly, it is necessary to duplicate the relatively expensive, high powered computer. Secondly a large number of interconnections between the computers is required if the system includes several independent channels, as is customary. This may mean that more expensive computers have to be used. Thirdly, generally speaking, there are only control outputs from the computers when an actual skid situation arises and actual complete cross-checking therefore occurs only rarely. Fourthly the use of identical computers with identical programs will not reveal a program fault if this exists in a routine which is exercised only under special circumstances and it is possible, using identical devices from the same wafer powered by a common supply, that supply disturbance can produce similar computer faults which remain undiscovered unless they represent massive failures.

It is an object of the invention to provide a dual computer cross-checking system which overcomes these disadvantages.

In accordance with the invention there is provided a dual computer cross-checking system comprising a control computer, control data supply means for supplying control data to the control computer, said control computer processing said control data and producing control output signals, a monitoring computer for checking the operation of the control computer, said control computer and said monitoring computer being arranged to interchange check data on a cyclic basis, each computer carrying out a predetermined calculation on the check data it receives from the other computer and each computer checking that the check data received from the other computer bears a predetermined relationship to the check data it transmitted to the other computer in the previous cycle and shut-down means controlled by both computers for shutting down the control system in the event that at least one of said checking operations reveals a discrepancy.

With such an arrangement, the monitoring computer may be of a less expensive, less powerful type than the control computer. It may, for example, run at a lower clock frequency.

Preferably one of the two computers operates as a master computer controlling the timing of check data interchange. It is preferable that it should be the control computer which is the master computer so that the check data interchange can be timed to coincide with precise points in the control operating cycle thereof. Failure to receive check data at the precise point when it is expected is interpreted as a failure which causes said shut-down means to operate.

The check data may consist of a single byte which may be transmitted either serially or in parallel between the two computers. In this case the predetermined calculation carried out by each computer may include the addition of a prime number to the value of the byte in each cycle. Such addition is preferably effected in a series of separate stages throughout the operating cycle of the computer in question. Further "calculation" operations may include, for example, the reversal of the order of the individual bits of the control data byte. Preferably the algorithms used by the two computers are different although the overall result of each algorithm is the same.

The shut-down means may be arranged to operate on the first occasion that a check data discrepancy is found. However, if the control system is to be used in a noisy environment, such as in a motor vehicle brake control system, it is preferable to arrange for each computer to maintain a count of discrepancies occurring in a period and to operate said shut-down means only if such count reaches a preset level. Thus, for example, each computer may have two counters (in its software) one of which counts the number of correct check cycles and the other of which counts the number of check cycles in which a discrepancy occurs, said other counter being decremented (if not already at a count of zero) each time a predetermined number of counts is made by the first-mentioned counter.

The invention is described further hereinafter, by way of example only, with reference to the accompanying drawings, in which.

Figure 1:
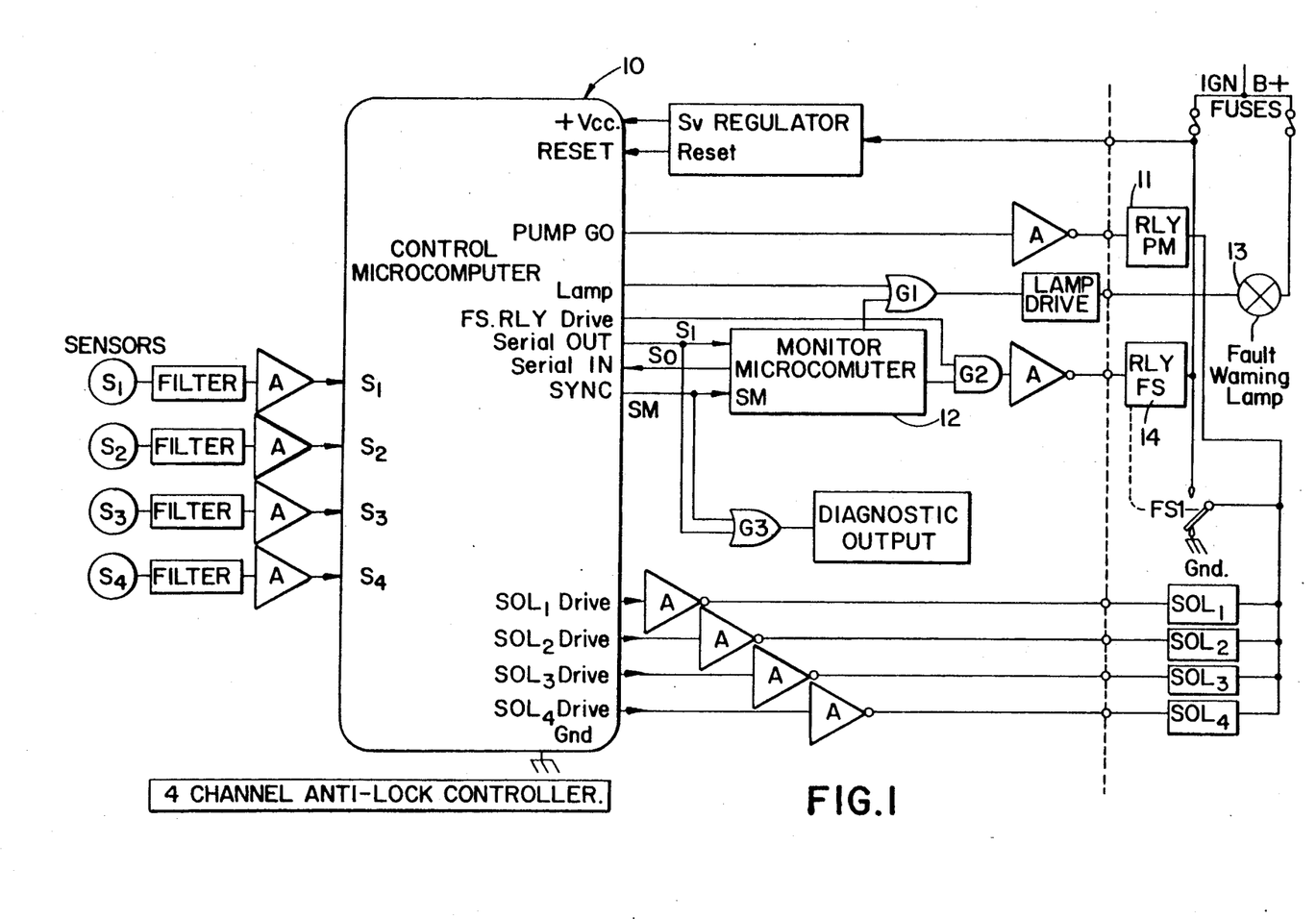
FIG. 1 is a block diagram of an anti-lock braking system which incorporates an example of a dual computer cross-checking system in accordance with the invention.

Referring firstly to FIG. 1, the system shown includes a main control microcomputer 10 which receives control input data from four wheel speed sensors $S_1$ to $S_4$ and controls four solenoids $SOL_1$ to $SOL_4$ in accordance with the input data as well as controlling a pump relay 11. The main computer thus performs the task of data gathering from the wheel speed sensors and making control decisions which are relayed to the brakes by solenoid drive signals. Additionally the main computer has a pump motor drive signal which energises the relay 11 to ensure the brake reapply energy source, a shut down relay 14 drive signal which is normally energised so as to connect the battery B+ supply to the solenoids and the pump motor relay coil, and a lamp drive signal to illuminate a fault warning lamp 13 in the event of any failure being detected. This latter signal is taken to the driver stage via an OR gate G1 where it is combined with a similar signal from a monitor computer 12 so that either signal being active will switch on the lamp 13.

Generally speaking the system operates in known manner such that if any wheel is found to be slowing down too rapidly during a braking operation, the corresponding solenoid is energised and operates a valve which cuts the brake of the wheel in question off from the brake master cylinder and allows brake fluid to be released into a reservoir from which it is returned in due course by the pump which is controlled by relay 11, so as to reapply the brake.

The monitoring microcomputer 12 is also included for monitoring the operation of the control computer. This monitoring computer has its own clock which may run at a lower speed than that of the control computer. It is preferably a cheaper, less powerful device than the control computer, having less RAM and less ROM and it may be a completely different type from the control computer 10.

This monitoring computer 12 can be connected to the control computer by three lines only, i.e. $S_0$, $S_1$ and SM. Line $S_0$ connects a serial output of the monitoring computer 12 to a serial input of the control computer. Line $S_1$ connects a serial output of the control computer to a serial input of the monitoring computer and line SM connects a synchronization output of the control computer to a corresponding input of the monitoring computer. The serial output from the monitor computer can be taken from a generated serial port on the monitor computer in the event that a very low cost device is used which does not have a serial $I/0$ facility. (As will be evident, two computers both with dedicated $I/0$ could be interconnected with greater ease, or parallel data exchanges could be substituted if very rapid transfers were required and a higher cost incurred). The $S_1$ and SM lines are also connected to a gate $G_3$ to provide serial data to a diagnostic output.

Under all normal operating conditions, there is a predictable sequence of data flow between the two computers, resultant processing of this check data within both computers and regular synchronisation of the independently clocked monitor computer from the main computer Additionally, both computers provide drive signals to the shut down relay drive stage via AND gate G2 in order to maintain the energisation of FS relay 14 and thereby the connection of power to the solenoids and PM pump relay 11. Further outputs are provided by each computer to OR gate G1 in the lamp drive input circuit but these signals are inactive until there is a fault condition detected by either one of the computers.

Figure 2:
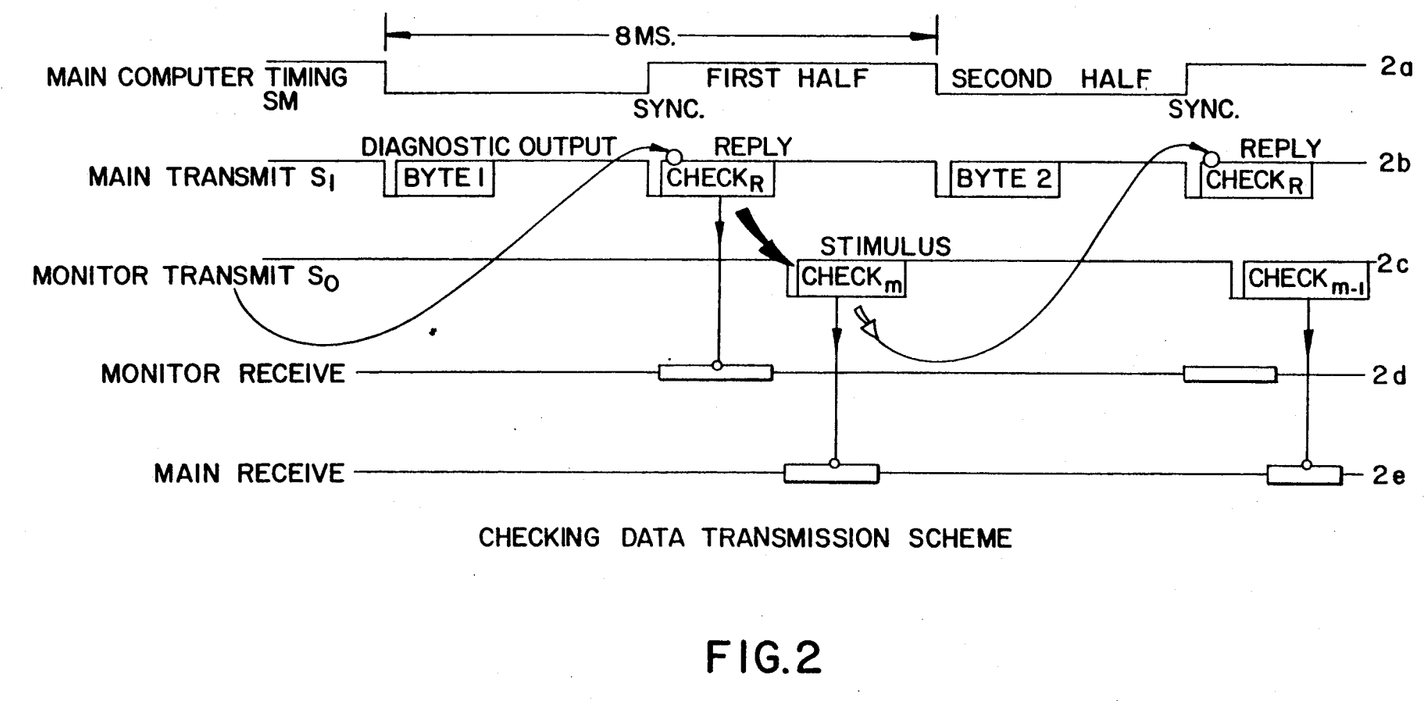
FIG. 2 is a timing chart showing an example of the timing of check data interchange.

The main and monitor computers have separate clock crystals, the main computer being used as the master timing element to which the control accuracy is related. This master timing cycle is set typically at 8 mS or 16 mS and control decisions are made in each cycle on the basis of data gathered in the previous cycle, with the output signals to the solenoid valves being generated as soon as the control algorithm is completed. In some systems the main computer serial output may also be used to output a data byte at each cycle period, for diagnostic purposes. If this is the case, the cycle may be split into two halves by a master timing waveform generated by the master microcomputer. This is shown in FIG. 2 where the SM waveform from the master computer selects the UART connection as a diagnostic output when low and, on the low-to-high transition effects the timing re-synchronisation of the monitor computer. With SM high the serial output will be directed to the cross-checking inter- communication task between the two computers which may take place at a different data transmission (baud rate) than the diagnostic communication.

The typical timing waveforms shown in FIG. 2 are based on an 8 mS cycle which commences with a synchronising edge as the SM line changes from a 0-1. The monitor computer timing is restarted at this edge and a window is opened for a short period in which a byte is expected from the main computer. This byte will be the response to the stimulus sent out from the monitoring computer during a set period within the previous cycle. Correct receipt of this byte CHECKR results in the internal check taking place within the monitor when CHECKR is compared with the monitor computer's calculated reply. Agreement produces the already calculated next stimulus for transmission to the main computer, at a given time after the rising edge of the SM waveform which performed synchronisation. The main computer has typically some 7 mSec in which to process this stimulus data and ready the reply byte CHECKR for transmission just after the next synchronising edge.

Referring again to FIG. 2, the upper trace 2a shows the signal of the SM line, which, as shown, is alternately high for 4 mS and low for 4 mS. The rising edges of this waveform trigger transmission of serial data to the monitoring computer whilst the low SM gate level triggers transmission of serial data to the diagnostic output. The trace 2b shows the data transmission periods for the control computer 10, on line $S_1$ whilst trace 2c shows the transmission periods for the monitoring computer 12 on line $S_0$.

As explained above, the control computer 10 acts as the master computer in this data transmission scheme, each new cycle starting with the transmission of check data from the control computer 10 to the monitoring computer. After a fixed time, during which the monitor computer tests the check data result received from the control computer, the monitoring computer transmits to the control computer the next byte of check data.

The checking sequence is as follows:

(a) A check reply byte is transmitted from the main computer at a specific point in each 8 mS cycle, in response to a stimulus byte received from the monitor computer in the previous cycle.

(b) Reception of this byte at the monitor computer causes a check on the data value and if correct a new stimulus byte is issued and transmitted serially to the main computer to form the next stimulus. Again a timing window is generated during which this stimulus is acceptable to the main computer.

(c) Data processing takes place on the stimulus data generated by the monitor computer in order that the main computer can generate the response byte.

(d) The monitor computer also computes the response byte so that it knows the data value to expect from the main computer response and can check for equality on receipt.

(e) The monitor computer is programmed to calculate the next stimulus byte from the previous check reply byte so that a known progression can be produced.

(f) The main computer is programmed to also calculate the next stimulus byte that should be presented from the monitor by simple processing of the previous stimulus data. The first check on the stimulus received by the main computer must show agreement with the internally calculated expected stimulus or the required processing in the main computer is not undertaken and the return byte in the next cycle is omitted.

In this computer cross-checking combination, both the monitor and main computers are required to produce a specified output signal to prevent system shut down. Thus, if either computer receives an input check byte which differs from that which is expected (through internal calculation) the local support signal which maintains operation will be removed. Typically this support signal combination maintains the energisation of the shut down relay 14, so that removal of either support signal will release this relay 14 and disable all control outputs from the controller. Clearly in some systems this relay can be effected by a solid state switch and the release signal may be used to effect the selection of some suitable default settings should the process be a vital vehicle function from which control cannot be completely withdrawn. Current practice in anti-lock braking systems however, is to disable the output signals to the solenoids, thereby reverting to normal brakes and issuing from either computer, where the failure was detected, a signal which lights the fault warning lamp 13.

Figure 3:
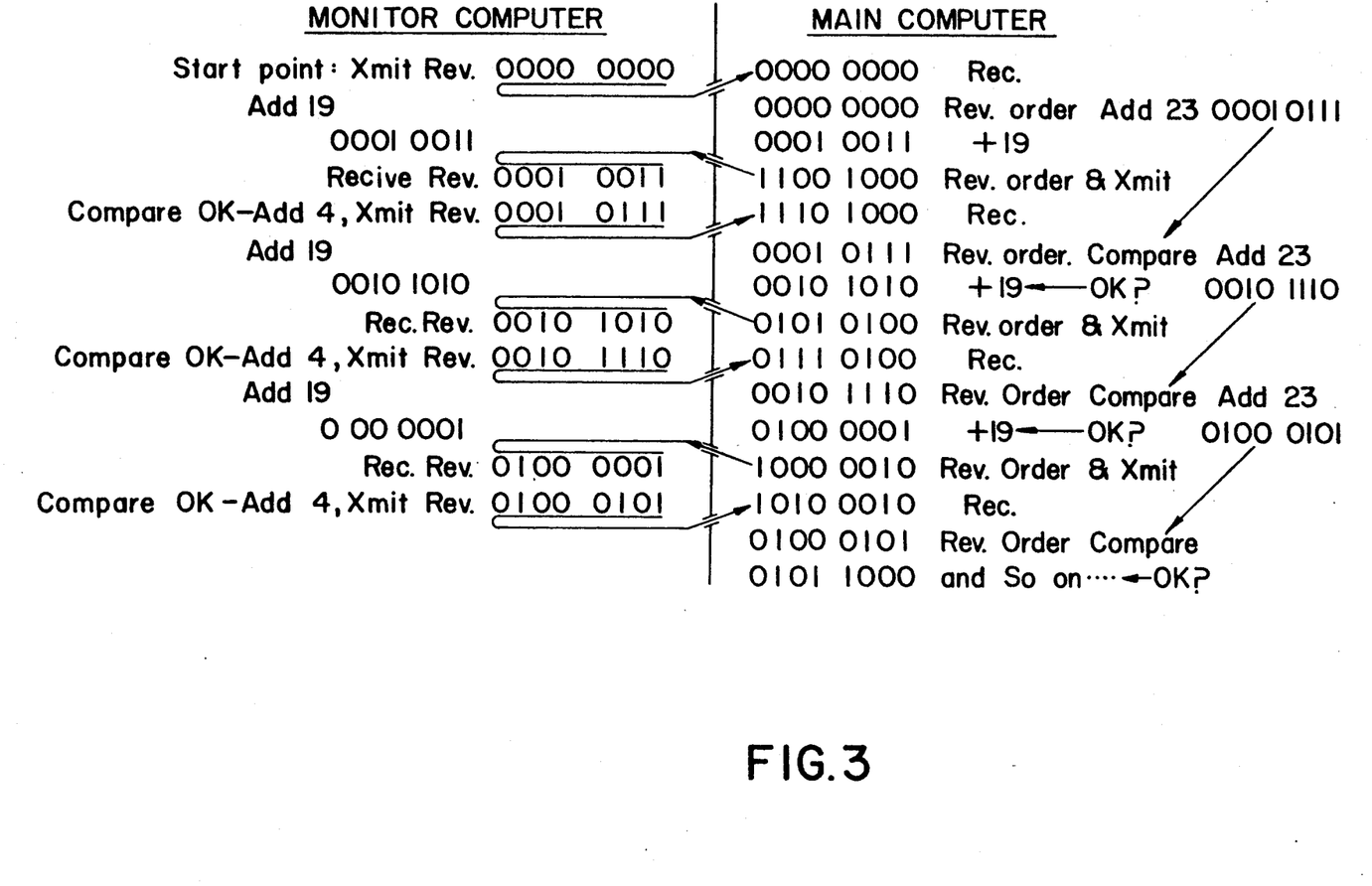
FIG. 3 is a table illustrating an example of the check data algorithms for the two computers.

The process chosen for each check stimulus to be subjected to before the reply byte is produced can be complex and is of course open to great variation as selected by the system designer. It may not always be the same process since, depending on the value of the stimulus byte, one of a pre-arranged selection of processes pre-programmed into both computers, could be chosen. FIG. 3 shows, for the purpose of a simple illustration, one way in which the two computers use the check data to cross-check on the operation of the other. At the commencement of the first cycle of operation of the system, the monitor computer has a check data byte 0000 0000 and transmits this at the appropriate time to the main control computer. The check data is transmitted bit by bit with the most significant bit first and this bit becomes the least significant bit of the byte received by the control computer. The first operation carried out by the control computer on the check data byte is to reverse the order of its bits (at this stage this is insignificant as the bits are all zero, but in later cycles it is of significance). A prime number, such as 19, is now added to the byte held in the control computer so that a value of 0001 0011 is generated. The order of the bits in this byte is then reversed again and the byte is transmitted to the monitor computer at the appropriate time. The value of the received byte (which is stored with its bits in reversed order) is compared with a value generated by adding 19 to the original value of the byte sent in the previous cycle. If the comparison verifies that the values are the same the next value to be transmitted is generated by adding 4 to the received byte (i.e. 0001 0111) which is transmitted to the control computer and received again with the order of the bits reversed. On receipt by the control computer the bits are rewritten in reverse order and the resulting byte is compared with the value of the last byte received in reverse order plus 23. If this comparison is correct then 19 is added again, the bit order is reversed and the resulting byte is transmitted and so on. The bit reversals are an extra task which is useful for control computer checking, but these are not an essential part of the data transfer test.

It should be emphasised that the number 19 chosen for the above example is in no way significant. What is significant, however, is the progression from one check stimulus value to the next. This is set at 23, though any prime number would be satisfactory, so that over 256 data exchanges every possible combination of bits in an 8-bit byte is used for both stimulus and reply. Thus, over a 2-sec period the test processing will be repeated for a sufficient number of times to carry out a full capability check of all the parallel parts of the major elements of each computer's processing circuitry.

Thus, in the example illustrated above, the main computer process will be seen from the table of FIG. 3 to comprise typically the following steps:

(1) Receive a stimulus data byte at a precise time in the cycle.

(2) Reverse the order of all bits of this byte which is transmitted in reverse.

(3) Test this value against the stored expected value and calculate the next expected value by adding 23 and store.

(4) If the correct stimulus has been received add the constant 19 by whatever multi-step method the system designer has selected.

(5) Reverse the order of all bits of the result.

(6) Transmit the result to the monitor just after the synchronising edge.

The main task in this routine, that of adding 19 to the stimulus byte, can obviously be done in a single step or much more usefully can be done by a complex and multi-step process which is as long and involved as is practical considering the main control task and the time and capacity restrictions placed on the main computer. Typically this addition of 19 will be split up into a sufficient number of steps so that these can be distributed into the main control task of the computer in such a way as to test the computer instructions and facilities such as index register addressing, stack operation and some conditional branching. When the main computer control program operates on a known cycle the steps to achieve the addition of 19 are distributed into the normal control routines so that any skipping of any routine will miss out a vital step in the said 'addition' process, thereby producing an incorrect result which will indicate a failure causing the monitor computer to give shut down.

Figure 4:
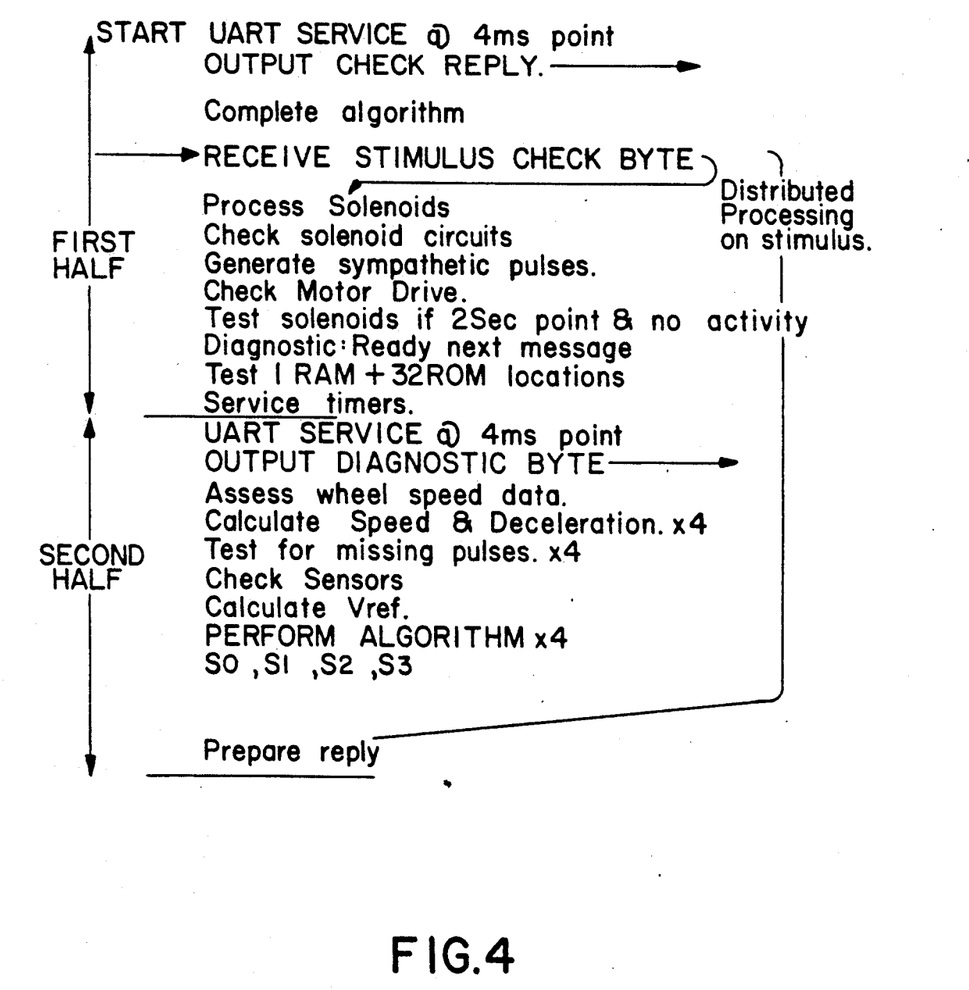
FIG. 4 is a table illustrating an example of the main control cycle of one of the two computers.

FIG. 4 illustrates an example of a typical anti-lock control program wherein the processing of the check data received by the control computer 10 is not carried out immediately on receipt, but is spread over the entire cycle of the main computer 10. Thus the first bit order reversal, the comparison with the last data byte received, the addition and the second bit order reversal can be broken down into separate stages interposed with the various control tasks carried out by the control computer. In particular, as explained above, the task of adding 19 can be split and made into an operation of considerable complexity involving adding or subtracting different values at a plurality of different points in the cycle. Other possible operations may involve moving the byte between different registers, stack operations and some conditional branching. These routines may be embedded in different subroutines of the main control program so that if any subroutine is missed for any reason a vital step in the addition of 19 is omitted there will be an error in the addition.

Returning now to FIG. 1 it will be seen that further gates $G_1$ and $G_2$ have inputs from further output connections of the two computers 10 and 12. These gates control a lamp 13 and a solenoid disconnect relay 14 respectively. The lamp is lit and the solenoid power supply disconnected if either of the two computers removes a GO signal indicated either that, an expected byte of check data has not been received or that the result of the comparison referred to was unsatisfactory. The GO signal may be removed whenever a single error occurs. Alternatively, the software of each computer may include two counters, one of which is incremented each time an incorrect comparison is made, and the other of which is incremented each time a good comparison is made, provided the first mentioned counter is not at zero. This is arranged to decrement the count of the first counter after a preset number of correct comparisons unless the count of the other counter is already zero. If the count held by the first counter reaches a threshold level, the GO signal is removed. The preset level and the threshold level are chosen by the designer to provide a noise tolerance level to suit the process controlled and the electrical environment.

The system described above requests both computers to continually progress through repeated sequences of check data and is characterised by an organisation which requires any single error or comparison, whether resulting from calculation or transmission, to cause shut down. However, for some systems which may have to operate in a very noisy environment, e.g. where power supplies have considerable transients superimposed, there may exist a range of conditions under which check data transmissions may be affected causing an error and consequent shut down of what is otherwise a perfectly good system. Under these circumstances it is desirable to have built into the operating scheme of the computer combinaiton, a defined level of fault tolerance. To achieve this, the checking scheme must be modified so that a single error is registered but does not cause system shut down and if the thread of the stimulus data progression is lost due to a transmission error, this can be recovered and the sequence re-instated at a suitable point. This can be achieved in total by a software variation to the scheme described above by arranging that the main computer calculates the next expected stimulus data by always adding 23 to the previously received stimulus byte, even if this was incorrect, and the monitor computer always calculates the expected result by adding 19 to the stimulus data output in the previous cycle. Further, if no agreement between the expected result and the received result is obtained, the next stimulus is issued as either 4+ the received result or 4+ the calculated result, but neither the monitor or main computers cause immediate shut down. Either computer receiving data which appears incorrect enters a fault pending state by registering internally, a non-zero count in a suspected fault location. If this fault is repeated, the suspect count is incremented until a count of n1 is registered at either computer, at which point a local shut down is generated as a non-transient check failure is deemed to have been detected. In the event of a transient failure, e.g. due to a transmission interference, the suspect fault counter will be incremented away from zero but non-repetitive failures to cause the sequence of data exchanges to be re-instated satisfactorily at a typical count of 1 or 2. Under these intermediate non-zero conditions in the suspect counter, a second counter is enabled to count the exchange cycles in which no fault is recorded and, should this counter reach level n2, this count is set back to zero and the suspect count is reduced. Continuing correct data exchanges reduce the suspect counter eventually to zero when all counting is discontinued until such time as another faulty exchange of data is detected. By suitable choice of values for n1 and n2 the tolerance level can be adjusted to a setting which is appropriate to the process and the electrical environment It will be appreciated that the systems described above can be particularly suitable for lower cost anti-lock installations in that the two computers need not be identical and are not therefore subject to the same failure modes, yet are able to continually cross-check each other's operation so as to critically detect any serious failure in their processing function or operating cycle. A substantial cost saving can be made compared to known systems since there is a main computer and lower cost monitoring computer used in the combination, in place of two expensive main computers, but the cross-checking function is continuous and does not depend upon the occurrence of skidding input signals to make a full operational cross-checking available.

What is claimed is:

1. A dual computer cross-checking system comprising:
    a control computer;
    control data supply means for supplying control data to said control computer;
    means in said computer for processing said control data and producing control output signals;
    a monitoring computer for checking the operation of the control computer;
    means for interchanging check data between the control computer and the monitoring computer on a cyclic basis;
    means in each computer for carrying out a predetermined calculation on the check data it receives from the other computer whereby to modify that check data in a predetermined manner;
    means in each computer for checking that the modified check data received from the other computer bears a predetermined relationship to the check data it transmitted to the other computer in the previous cycle; and
    shut-down means controlled by both computers for shutting down the control system in the event that at least one of said checking operations reveals a discrepancy.

2. A dual computer cross-checking system according to claim 1, wherein one of said two computers operates as a master computer, said one of the computers including means for controlling the timing of check data interchange to synchronise the operation of the other computer and the transmission of each element of check data to coincide with precise predetermined points in the operating cycle of said one computer operated as the master.

3. A dual computer cross-checking system according to claim 2, including means for constraining both computers to receive the respective transmissions of the other at precise predetermined points in a master operating cycle, and means for interpreting failure of such reception as an operating fault which causes said shut-down means to operate.

4. A dual computer cross-checking system according to claim 3, including means operating the control computer as a master computer to control the timing of check data interchange to coincide with precise points in the control operating cycle thereof, and means for interpreting failure to receive check data at the precise point when it is expected as a failure which causes said shut-down means to operate.

5. A dual computer cross-checking system according to claim 4, wherein the control computer acting as the master includes means for conveying a master timing cycle to the other computer by a synchronising means in each cycle of control operation, and means for determining the timing of all data exchanges in relation to the active transition of this synchronising means.

6. A dual computer cross-checking system comprising:
- a control computer.;
- control data supply means for supplying control data to said control computer,
- means in said computer for processing said control data and producing control output signals;
- a monitoring computer for checking the operation of the control computer;
- means for interchanging check data between the control computer and the monitoring computer on a cyclic basis, the check data consisting of a single byte;
- means in each computer for carrying out a predetermined calculation on the check data it receives from the other computer, said predetermined calculation carried out by each computer including the addition of a prime number to the value of the byte in each cycle;
- means in each computer for checking that the check data received from the other computer bears a predetermined relationship to the check data it transmitted to the other computer in the previous cycle; and
- shut-down means controlled by both computers for shutting down the control system in the event that at least one of said checking operations reveals a discrepancy.

7. A dual computer cross-checking system according to claim 6, wherein said predetermined calculation is not performed as a single routine but is broken down into a plurality of sub-routines which are distributed throughout the control processing sequence.

8. A dual computer cross-checking system comprising:
- a control computer;
- control data supply means for supplying control data to said control computer;
- means in said computer for processing said control data and producing control output signals;
- a monitoring computer for checking the operation of the control computer;
- means for interchanging check data between the control computer and the monitoring computer on a cyclic basis;
- means in each computer for carrying out a predetermined calculation on the check data it receives from the other computer;
- means in each computer for checking that the check data received from the other computer bears a predetermined relationship to the check data it transmitted to the other computer in the previous cycle; and
- shut-down means controlled by both computers for shutting down the control system on the first occasion that a check byte discrepancy is found.

9. A dual computer cross-checking system comprising:
- a control computer;
- control data supply means for supplying control data to said control computer;
- means in said computer for processing said control data and producing control output signals;
- a monitoring computer for checking the operation of the control computer;
- means for interchanging check data between the control computer and the monitoring computer on a cyclic basis;
- means in each computer for carrying out a predetermined calculation on the check data it receives from the other computer;
- means in each computer for checking that the check data received from the other computer bears a predetermined relationship to the check data it transmitted to the other computer in the previous cycle;
- shut-down means controlled by both computers for shutting down the control system in the event that at least one of said checking operations reveals a discrepancy; and
- means in each computer for maintaining a count of discrepancies occurring in a period and for operating said shut-down means only if said count reaches a predetermined level.

10. A dual computer cross-checking system according to claim 9, wherein each computer includes two counters in its software, one of which counts the number of correct check cycles and the other of which counts the number of check cycles in which a discrepancy occurs, and means for decrementing said other counter (if not already at a count of zero) each time a predetermined number of counts is made by the first-mentioned counter, said shut-down means being actuated if the count of said other counter reaches a predetermined threshold.

11. A dual computer cross-checking system comprising:
- a control computer;
- control data supply means for supplying control d data to said control computer;
- means in said computer for processing said control data and producing control output signals;
- a monitoring computer for checking the operation of the control computer;
- means for interchanging check data between the control computer and the monitoring computer on a cyclic basis, the check data consisting of a stimulus byte and a reply byte;
- means in each computer for carrying out a predetermined calculation on the stimulus byte it receives from the other computer and passing back the result to the first computer in the form of the reply byte;
- means in each computer for checking that the stimulus byte received from the other computer bears a predetermined relationship to the reply byte it transmitted to the other computer in the previous cycle;
- shut-down means controlled by both computers for shutting down the control system in the event that at least one of said checking operations reveal a discrepancy; and
- means in the control computer for comparing each newly received stimulus byte with the stimulus byte received at the control computer in the previous cycle and, if a preprogrammed difference is not detected, shut-down is not immediately effected but is delayed until a first counter, which is incremented away from zero at each comparison failure, reaches a preset first count, and wherein, at intermediate non-zero values of this first counter, a second counter is incremented at each correct comparison such that when this second counter reaches a second preset level it is reset and the first counter is reduced, this process being repeated until one of the conditions occurs that the first counter is reduced to zero again, and the first preset count is reached and shut-down occurs, and wherein the monitor computer, which compares reach received reply byte with its internally calculated reply, is similarly equipped with first and second counters operating in an entirely equivalent manner to those of the control computer.

12. A dual computer cross-checking system comprising:

a control computer;

control data supply means for supplying control data to said control computer;

means in said computer for processing said control data and producing control output signals;

a monitoring computer for checking the operation of the control computer, the monitoring computer being of a less powerful type than the control computer;

means for interchanging check data between the control computer and the monitoring computer on a cyclic basis;

means in each computer for carrying out a predetermined calculation on the check data it receives from the other computer;

means in each computer for checking that the check data received from the other computer bears a predetermined relationship to the check data it transmitted to the other computer in the previous cycle; and shut-down means controlled by both computers for shutting down the control system in the event that at least one of said checking operations reveals a discrepancy.

13. A dual computer cross-checking system according to claim 12, wherein one of said two computers operates as a master computer, said one of the computers including means for controlling the timing of check data interchange to synchronise the operation of the other computer and the transmission of each element of check data to coincide with precise predetermined points in the operating cycle of said one computer operated as the master.

14. A dual computer cross-checking system comprising:

a control computer;

control data supply means for supplying control data to said control computer;

means in said computer for processing said control data and producing control output signals;

a monitoring computer for checking the operation of the control computer;

means for interchanging check data between the control computer and the monitoring computer on a cyclic basis;

means in each computer for carrying out a predetermined calculation on the check data it receives from the other computer;

means in each computer for checking that the check data received from the other computer bears a predetermined relationship to the check data it transmitted to the other computer in the previous cycle;

shut-down means controlled by both computers for shutting down the control system in the event that said on the check data reveals a discrepancy;

means for constraining both computers to receive the respective transmissions of the other at precise predetermined points in a master operating cycle; and means for interpreting failure of such reception as an operating fault which causes said shut-down means to operate.

* * * * *